United States Patent [19]
Pashley et al.

[11] Patent Number: 6,127,783
[45] Date of Patent: Oct. 3, 2000

[54] LED LUMINAIRE WITH ELECTRONICALLY ADJUSTED COLOR BALANCE

[75] Inventors: Michael D. Pashley, Cortlandt Manor; Thomas M. Marshall, Hartsdale, both of N.Y.

[73] Assignee: Philips Electronics North America Corp., New York, N.Y.

[21] Appl. No.: 09/216,262

[22] Filed: Dec. 18, 1998

[51] Int. Cl.$^7$ .................................................. H05B 37/02
[52] U.S. Cl. .................. 315/149; 315/312; 315/307; 315/360; 250/205; 250/226
[58] Field of Search ...................... 315/312, 307, 315/360, 149, 152, 154, 158, 169.3; 250/205, 226, 552, 553, 214 C

[56] References Cited

U.S. PATENT DOCUMENTS

| | | | |
|---|---|---|---|
| 3,760,174 | 9/1973 | Boenning et al. | 315/312 X |
| 4,810,937 | 3/1989 | Havel | 315/152 |
| 5,268,828 | 12/1993 | Miura | 362/249 |
| 5,301,090 | 4/1994 | Hed | 362/32 |
| 5,471,052 | 11/1995 | Ryczek | 250/226 |

OTHER PUBLICATIONS

Patent Abstract of Japan: Publication No.: 10281873, Publication Date Oct. 23, 1997; Application No.: 09083483.
Patent Abstract of Japan: Publication No.: 60216336. Publication Date Oct. 29, 1985; Application No: 59071886.

*Primary Examiner*—Haissa Philogene
*Attorney, Agent, or Firm*—F. Brice Faller

[57] ABSTRACT

A white light emitting luminaire includes a plurality of LEDs in each of the colors red, green, and blue with a separate power supply for each color and a photodiode arranged to measure the light output of all the LEDs. The light output of each color is measured by an electronic control circuit which turns off the LEDs for the colors not being measured in a sequence of time pulses. The measured light output for each color is compared to a desired output, which may be determined by user inputs, and corrections to the current for each color are made accordingly.

8 Claims, 3 Drawing Sheets

LED LUMINAIRE WITH ELECTRONICALLY ADJUSTED COLOR BALANCE

BACKGROUND OF THE INVENTION

The invention relates to a luminaire with an array red, green and blue light emitting diodes (LEDs), and more particularly to a white light emitting luminaire with a control system for adjusting the individual components to maintain a desired color balance (chromaticity).

U.S. Pat. No. 5,301,090 discloses an LED luminaire having an array of LEDs including a plurality of LEDs in each of the colors red, green, and blue. The LEDs for each color are wired in parallel and provided with a separate power supply, and a diffusion screen is provided over the array. The chromaticity of the assembly is manually controlled by three knobs for the respective colors; automatic control is not mentioned.

LEDs are semiconductor based; for a given drive current, light output varies from chip to chip, and also varies over the life of each chip. Light output also varies inversely with temperature, but not uniformly for each color. Finally, in a block of LEDs of a given color, the light output will vary if one or more of the LEDs fails. Given all the factors which can affect the color balance of any array of LEDs, it would be desirable to automatically monitor and regulate the color balance, especially in a white-light emitting luminaire.

It is known to control current to an array of LEDs in a given color based on temperature, for example in a traffic light. This scheme would be cumbersome in a luminaire having LEDs in a plurality of colors, because the temperature (and therefore the light intensity) does not vary uniformly for the various colors.

It would be desirable to automatically control the chromaticity of a white light emitting luminaire, without regard to the factors which cause the light outputs of the individual colors to vary.

It would further be desirable to automatically control the chromaticity without resorting to a spectrally resolving light measuring system such as a photodiode and filter for each of the respective colors.

SUMMARY OF THE INVENTION

According to the invention, the combined light output (chromaticity) of a white light emitting LED luminaire is electronically controlled based on measurements by a single photodiode arranged to measure the light outputs of all the LEDs in the array. This is accomplished by measuring the light output of the LEDs in each color separately in a sequence of time pulses. For an array of red, green, and blue LEDs, there are three time pulses in a measuring sequence. During each time pulse, the current for the colors not being measured is turned off. The response time of a typical photodiode is extremely short, so the measuring sequence can be performed in a sufficiently short time that an observer will not detect it (e.g. 10 ms).

Measured light outputs for the colors are compared to desired outputs, which may be set by user controls, and changes to the power supply for the color blocks are made as necessary. Chromaticity is thus automatically controlled without regard to the factors which may cause it to change. The user inputs permit varying the desired chromaticity to either warm white (more red output) or cool white (more blue output).

In order to best compensate for temperature dependent changes during a warm-up phase, the electronic control circuitry may undertake the measuring sequence more frequently during warmup. Less frequent measurements are sufficient to compensate for long term changes in the LEDs after a stable operating temperature is reached.

Where the LEDs in each color are wired in parallel, the failure of an LED can be automatically compensated by varying the current to the remaining LEDs during the next measuring sequence.

These and additional advantages of the invention will be apparent from the drawings and description which follows.

DETAILED DESCRIPTION OF THE PREFERRED EMBODIMENTS

Figure 1:
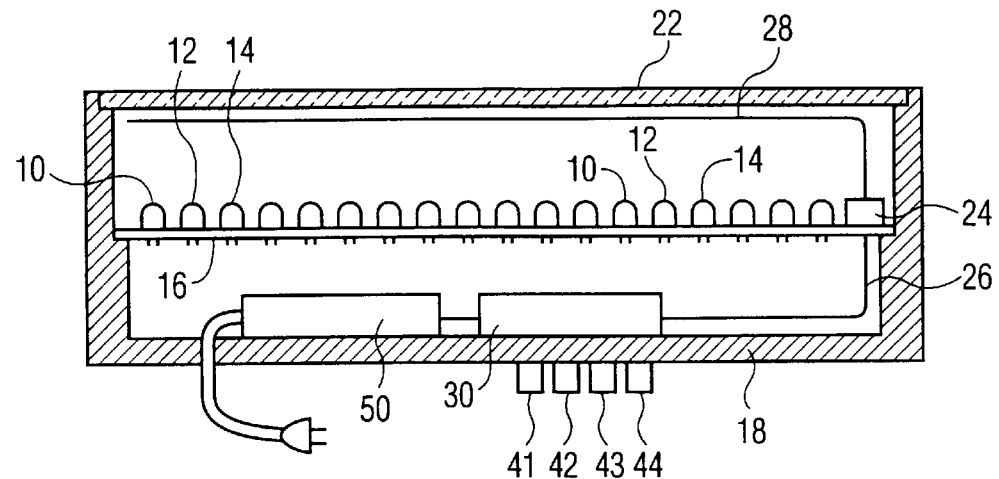
FIG. 1 is a cross-sectional view of a luminaire according to the invention, with an optical fiber light pick-up.

Referring to FIG. 1, an LED luminaire according to the invention includes a two dimensional array of LEDs 10, 12, 14 including a plurality of LEDs in each of a plurality of colors. In the present case the array includes red LEDs 10, green LEDs 12, and blue LEDs 14 mounted on a wired substrate 16 in a housing 18. The LEDs are arranged so that the overall light output will be white; a diffuser 22 mounted on the housing 18 is provided to enhance mixing. LEDs in additional colors, such as amber, may be used to enhance the mixing options. The mixing optics may include means other than a diffuser.

A single photodiode 24 is arranged to sense the light intensity of all the LEDs in the array. In FIG. 1 an optical fiber extending along the length of the housing 18 sends light to the photodiode 24, which generates corresponding current signals for controller 30 via feedback line 26. For small arrays the photodiode may be arranged to sense the light outputs directly. Large numbers of LEDs may be divided into arrays with a photodiode for each array, instead of the optical fiber arrangement depicted in FIG. 1.

Figure 2:
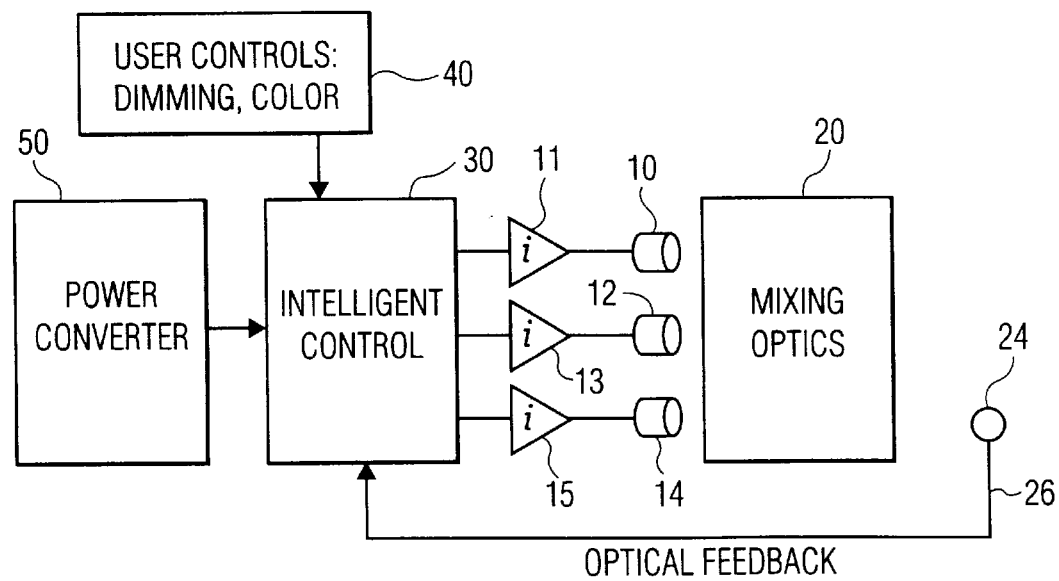
FIG. 2 is a schematic diagram of the luminaire.

Referring also to FIG. 2, the controller 30 translates the feedback from the photodiode 24 into color point measurements which are compared with desired settings provided via user inputs 40. Based on the comparison, the controller 30 decides whether the desired color balance is present, and accordingly signals the current regulators 11, 13, 15 for the respective diodes 10, 12, 14. A power input from the AC converter 50 is thus translated into current outputs which control the light intensity for the respective colors red, green, and blue to obtain the desired color balance. The diodes for each color of the array are kept at common potential by wiring on the substrate 16. User controls for the desired settings include inputs 41, 42, 43 for the respective colors, and a dimmer 44 which controls overall intensity of the resulting white light.

Figure 3:
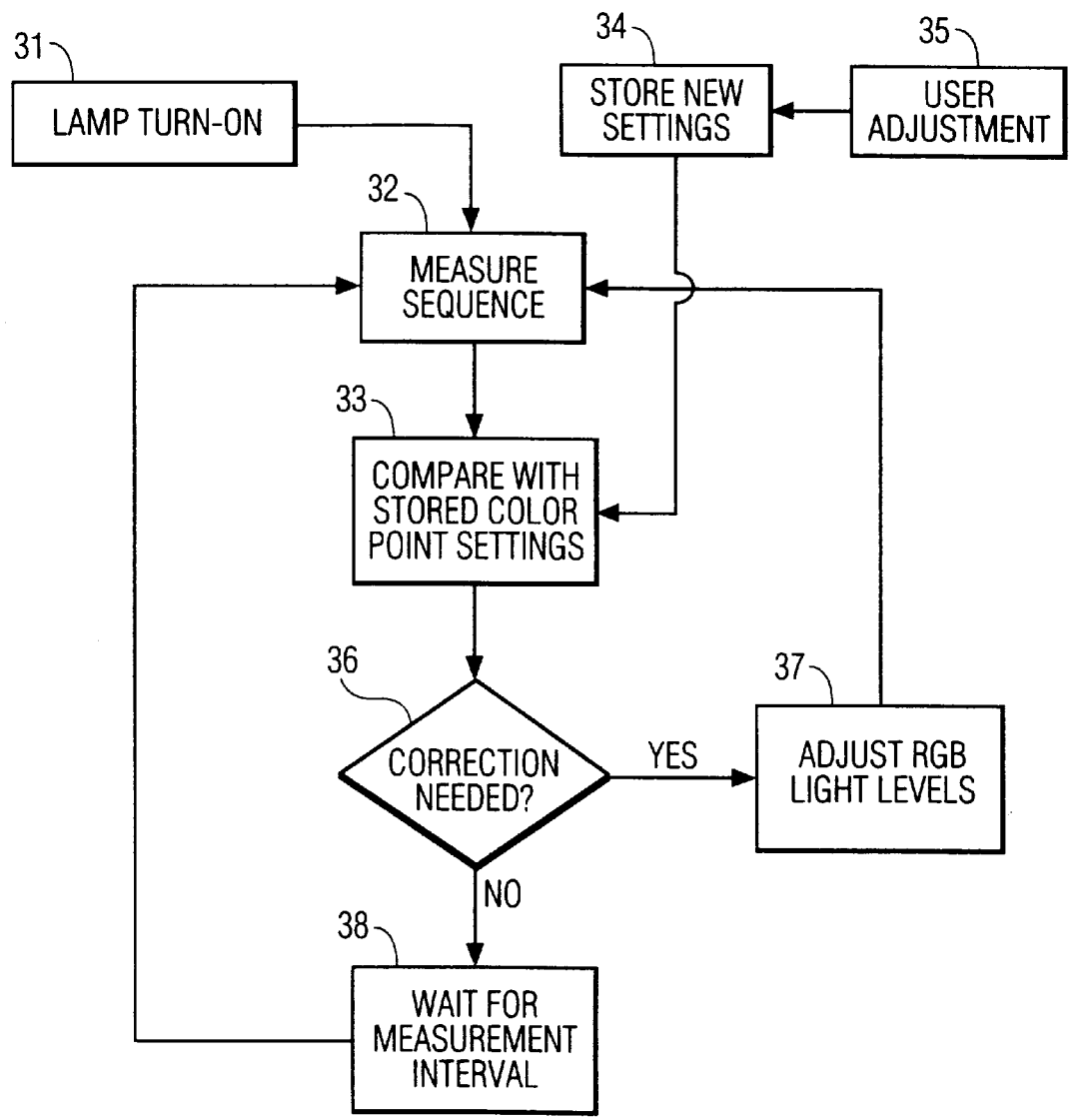
FIG. 3 is a diagram of the logic sequence for the controller.

FIG. 3 depicts the control logic for the luminaire in a diagram. When the lamp is turned on (31), power is provided to the LEDs and a measuring sequence is initiated (32). Color point measurements are compared (33) with desired settings which are stored (34) pursuant to user adjustment (35). Based on this comparison, it is determined (36) whether color adjustments are necessary, and if so, adjustments are made (37) and the measuring sequence is repeated (32). If it is determined that color adjustments are not necessary (36), the controller will wait for a predetermined measuring interval (38) before repeating the measuring sequence (32).

Figure 4:
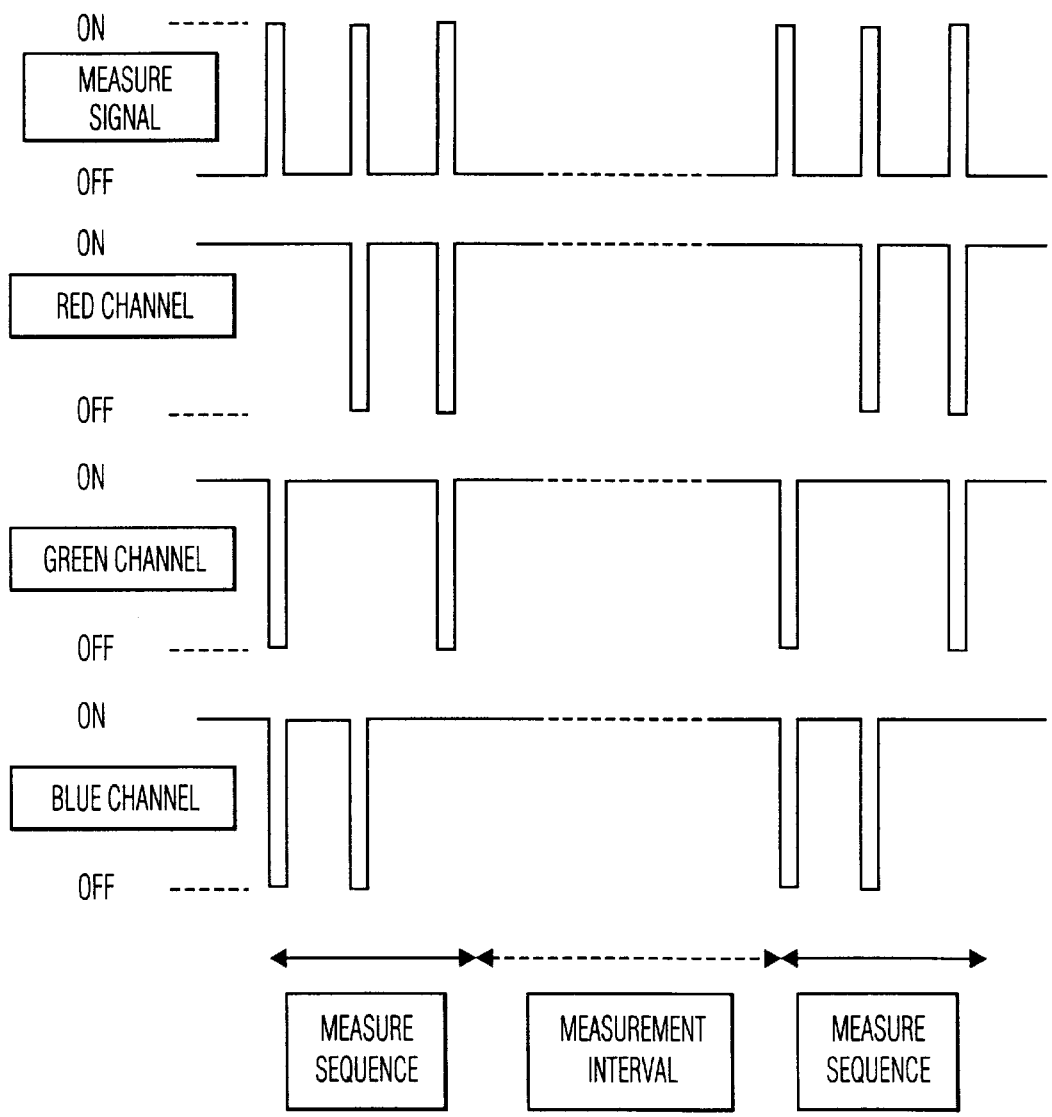
FIG. 4 is a timing diagram for the optical feedback system.

FIG. 4 is a timing diagram illustrating the control logic, which is executed while the luminaire is turned on. The topmost of the four traces is a measuring signal consisting of a series of three pulses (the measuring sequence), separated by a span of time (the measuring interval). During the first pulse, the green and blue LEDs are turned off and so the photodiode can measure the light intensity of the red LEDs; during the second pulse the red and blue LEDs are turned off so that the photodiode can measure the light intensity of the green LEDs; during the third pulse the red and green LEDs are turned off so that the photodiode can measure the light intensity of the blue LEDs. The control electronics then compares the measured intensities with the desired intensities and adjusts the current to one or more groups of LEDs as may be necessary.

The response time of a typical photodiode is extremely short, and each pulse can be so short that an observer will not detect it, e.g. 1.0 ms. Thus a measuring sequence can be performed during normal operation of the luminaire. The length of the measuring interval depends on how quickly the light output varies. This depends, for example, on how quickly the temperature of the LEDs is changing. It could range from every minute to every few hours; the control logic can be programmed for frequent measurements shortly after start-up, followed by less frequent measurements when stable operating temperature is reached.

It is possible for the luminaire to include more than one string of LEDs in each color, and to measure the outputs of the strings individually. For example, with two strings in each of three colors, a measuring sequence would have six pulses. In every case it is preferable to adjust the color balance based on all of the measurements in a sequence, rather than adjusting the individual colors based solely on the corresponding light output.

The foregoing is exemplary and not intended to limit the scope of the claims which follow.

What is claimed is:

1. A luminaire comprising
   an array of LEDs comprising at least one LED in each of a plurality of colors,
   means for supplying electrical current to said LEDs in each said color, whereby said LEDs in each said color have a light output, and the array has a combined light output when current is supplied to all of the LEDs in the array,
   a photodiode arranged to measure the light outputs of all the LEDs in the array,
   means for selectively turning off the electrical current to said LEDs so that the photodiode measures the light output for each color separately in a sequence of time pulses,
   means for comparing the measured light output for each color to a respective desired light output for each color, and
   means for adjusting the electrical current to the LEDs in each color based on said comparison, whereby a desired combined light output may be achieved using only a single photodiode for the array.

2. The luminaire as in claim 1 further comprising an optical fiber arranged to receive light from all LEDs in the array, said optical fiber being connected to said photodiode.

3. The luminaire as in claim 1 further comprising user input controls for setting the desired light outputs.

4. The luminaire as in claim 1 wherein said array of LEDs comprises LEDs in each of the colors red, green, and blue, said LEDs being arranged so that the combined light output is white.

5. The luminaire as in claim 4 further comprising mixing optics for mixing the colors to obtain a uniform white light.

6. A method for adjusting the color balance of an LED luminaire, said method comprising
   providing an array of LEDs comprising at least one LED in each of a plurality of colors,
   supplying electrical current to said LEDs in each said color, whereby said LEDs in each said color have a light output, and the array has a combined light output when current is supplied to all of the LEDs in the array,
   providing a photodiode arranged to measure the light outputs of all the LEDs in the array,
   sequentially measuring the light outputs of the LEDs for each said color using said photodiode,
   comparing the measured light output for each color to a respective desired light output for each color, and
   adjusting the electrical current to the LEDs in each color based on said comparison.

7. The method as in claim 6 wherein said sequentially measuring comprises
   providing electrical current to said LEDs in each said color separately in a measuring sequence having one time pulse for each color, and
   measuring the light output for one of said colors during each said time pulse.

8. The method as in claim 7 wherein said providing electrical current comprises
   turning off the electrical current for all but the color being measured during each said time pulse, and
   providing electrical current to all of said LEDs in the array between said pulses and during a measuring interval separating the measuring sequences.

* * * * *